United States Patent
Gore et al.

(10) Patent No.: US 7,018,953 B2
(45) Date of Patent: Mar. 28, 2006

(54) COMPOSITIONS, SYSTEMS, AND METHODS FOR IMAGING ONTO A SUBSTRATE

(75) Inventors: Makarand P. Gore, Corvallis, OR (US); Cari Dorsh, McMinnville, OR (US); Mark W. Minne, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 10/971,669

(22) Filed: Oct. 22, 2004

(65) Prior Publication Data

US 2005/0075248 A1    Apr. 7, 2005

Related U.S. Application Data

(63) Continuation-in-part of application No. 10/695,718, filed on Oct. 28, 2003, which is a continuation-in-part of application No. 09/976,877, filed on Oct. 11, 2001.

(51) Int. Cl.
*B41M 5/30* (2006.01)

(52) U.S. Cl. ............... 503/204; 106/31.16; 428/32.11; 430/945; 503/209

(58) Field of Classification Search ........... 428/32.11; 503/204, 209; 430/945; 106/31.16
See application file for complete search history.

(56) References Cited

U.S. PATENT DOCUMENTS

| 6,670,037 | B1 | 12/2003 | Okura et al. |
| 6,720,043 | B1 | 4/2004 | Sismondi et al. |
| 6,720,124 | B1 | 4/2004 | Takashima et al. |
| 6,805,929 | B1 * | 10/2004 | Koga et al. ............. 428/32.11 |
| 2003/0108708 | A1 | 6/2003 | Anderson et al. |

FOREIGN PATENT DOCUMENTS

| EP | 1 371 697 A2 | 12/2003 |
| EP | 1 371 697 A3 | 12/2003 |
| EP | 1 388 609 A1 | 2/2004 |
| WO | WO 02/078967 A1 | 10/2002 |
| WO | WO 03/032299 A2 | 4/2003 |

\* cited by examiner

*Primary Examiner*—Bruce Hess

(57) ABSTRACT

Disclosed herein are compositions, systems, and methods for making a labeling systems capable of being labeled using either electromagnetic radiation, or ink, or both.

12 Claims, 1 Drawing Sheet

COMPOSITIONS, SYSTEMS, AND METHODS FOR IMAGING ONTO A SUBSTRATE

RELATED APPLICATIONS

This application is a continuation-in-part of application Ser. No. 09/976,877 and application Ser. No. 10/695,718, both incorporated herein by reference.

BACKGROUND

Labeling of optical storage media such as Compact Discs, Digital Video Discs or Blue Laser Discs (CD, DVD, or Blue Laser Disc) can be routinely accomplished through screen printing methods. While this method can provide a wide variety of label content, it tends to be cost ineffective for run lengths less than 300–400 discs because the fixed cost of unique materials and set-up are shared by all the discs in each run. In screen printing, a stencil of the image is prepared, placed in contact with the disc and then ink is spread by squeegee across the stencil surface. Where there are openings in the stencil the ink passes through to the surface of the disc, thus producing the image. Preparation of the stencil can be an elaborate, time consuming and expensive process.

In recent years, significant increases in use of CD/DVD discs as a data distribution vehicle have increased the need to provide customized label content to reflect the data content of the disc. For these applications, the screen label printing presents a dilemma as discs are designed to permit customized user information to be recorded in standardized CD, DVD, or Blue Laser Disc formats. Today, for labeling small quantities of discs, popular methods include hand labeling with a permanent marker pen, using an inkjet printer to print an adhesive paper label, and printing directly with a pen on the disc media which has a coating that has the ability to absorb inks. The hand printing methods do not provide high quality and aligning a separately printed label by hand is inexact and difficult.

It may therefore be desirable to design an optical data recording medium (e.g., CD, DVD, or Blue Laser Disc) which may be individually labeled by the user easily and inexpensively relative to screen printing while giving a high quality label solution. It may also be desirable to design an optical data recording medium which accepts labeling via multiple methods, thus reducing the amount of inventory necessarily carried by optical data recording merchants and end users.

SUMMARY

The present invention relates to compositions, systems, and methods for imaging onto materials (e.g., CD, DVD, or Blue Laser Disc). Embodiments of the invention include laser beam-imageable coatings which also have the ability to absorb inks, making the coating acceptable for both laser imaging and inkjet imaging.

In another aspect of embodiments of the invention, the matrix is chosen such that it also is capable of absorbing inks (e.g., from an inkjet printer). Thus, the coating may be used for laser marking or printing or both.

BRIEF DESCRIPTION OF THE DRAWING

While the specification concludes with claims particularly pointing out and distinctly claiming that which is regarded as the present invention, the present invention can be more readily ascertained from the following description of the invention when read in conjunction with the accompanying drawing in which:

DETAILED DESCRIPTION

Figure 1:
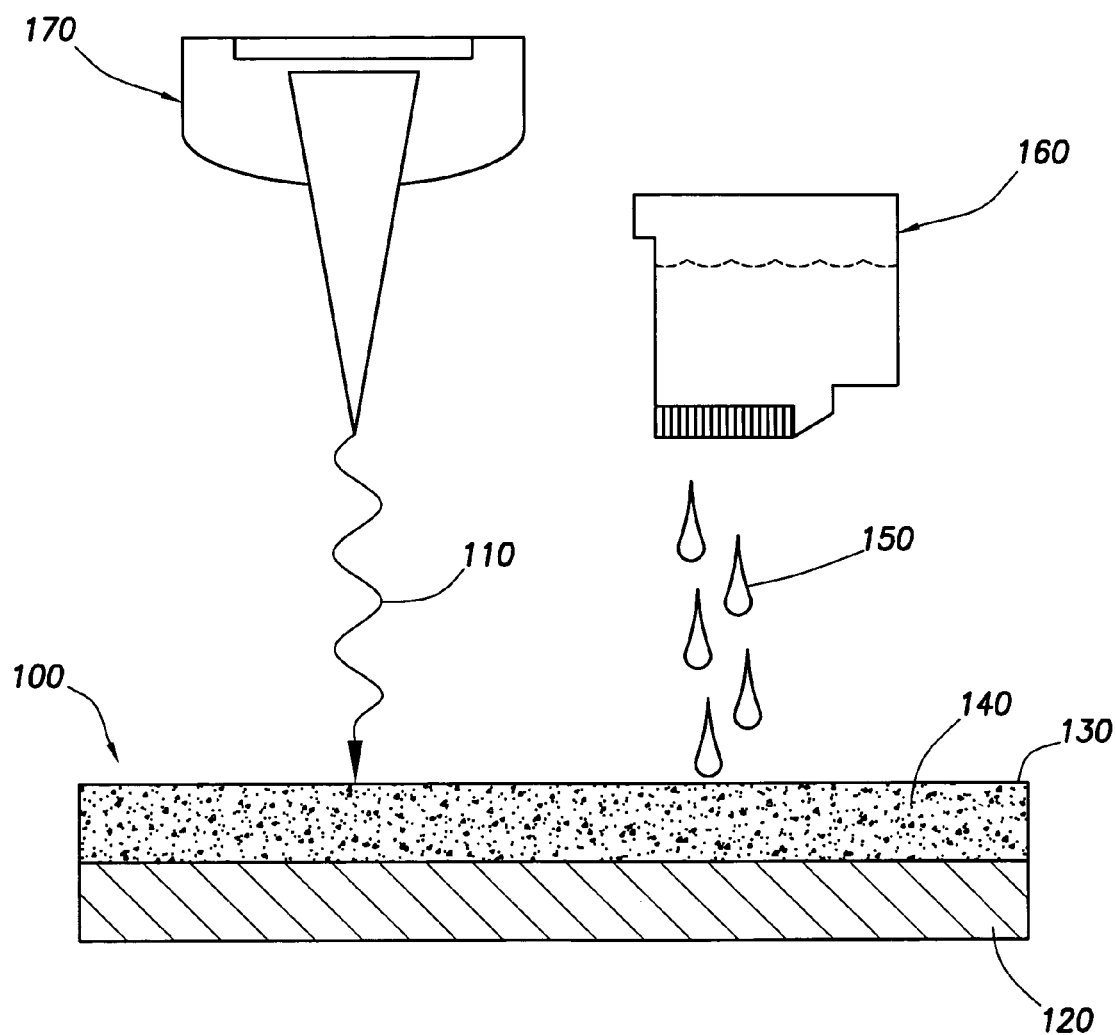
FIG. 1 shows a schematic drawing of the labeling of optical recording medium in accordance with embodiments of the present invention.

The present invention includes coatings that result in markings when marked with any suitable energy source such as, for example, IR radiation, UV radiation, or visible light. The materials used to produce color change upon stimulation by energy may include a color-former such as a leuco-dye and an activator dispersed in a matrix (such as radiation-cured acrylate oligomers and monomers) that is applied to a substrate. In particular embodiments, either the leuco-dye or the activator may be substantially insoluble in the matrix at ambient conditions. An efficient radiation energy absorber that functions to absorb energy and deliver it to the reactants is also present in the coating. Energy may then be applied, which results in either the activator, the color-former, or both becoming heated and mixed, causing the leuco-dye to become activated and a mark to be produced.

As used herein, the term "leuco-dye" means a color-forming substance which is colorless or of a first color in a non-activated state, and subsequently exhibits color or changes from the first color to a second color in an activated state. As used herein, the term "activator" is a substance, which reacts with a leuco-dye and causing the leuco-dye to alter its chemical structure and change or acquire color. By way of example only, activators may be phenolic or other proton-donating species that can effect this change. The term "antenna" means any radiation-absorbing compound. The antenna readily absorbs a desired specific wavelength of the marking radiation. The term "ink absorbing matrix" means a compound which absorbs ink such that a permanent readable mark may be produced when printed onto the matrix. For example, a matrix coated upon a CD, DVD, or Blue Laser Disc, which allows inkjet printing onto the disc is an ink absorbing matrix. The term "laser imaging system" means a system which, when exposed to a particular type of electromagnetic radiation, produces a mark.

A particular embodiment of the coating of the present invention includes a radiation-curable polymer matrix, such as, for example, a matrix based on UV-curable pre-polymers. An antenna is uniformly distributed or dissolved in the matrix. As used herein, the term antenna includes any compound that effectively absorbs radiation from an imaging laser. In some embodiments, the antenna is an infrared (IR) Dye. Examples of antennas include but are not limited to IR780 (Formula 1), IR783 (Formula 2), Syntec 9/1 (Formula 3), Syntec 9/3 (Formula 4), or metal complexes (such as dithiolane metal complexes (Formula 5) and indoaniline metal complexes (Formula 6)).

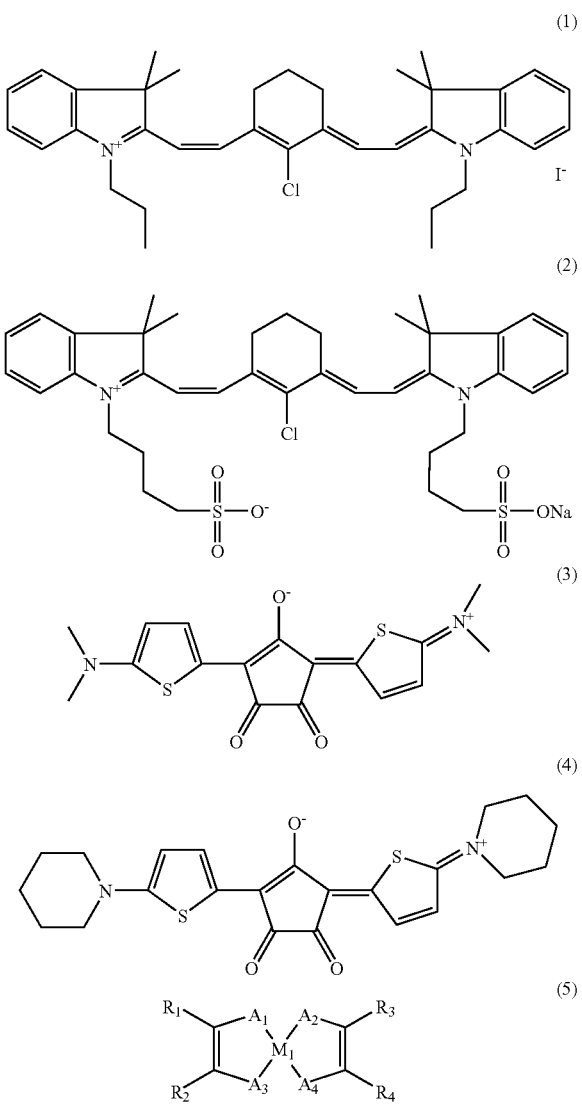

where $M_1$ is a transition metal, $R_1$, $R_2$, $R_3$, and $R_4$ are alkyl or aryl groups with or without halo substituents, and $A_1$, $A_2$, $A_3$, and $A_4$ can be S, NH, or Se;

where $M_2$ is Ni or Cu and $R_5$ and $R_6$ are aryl or alkyl groups with or without halo substituents. Also dissolved in the matrix is an acidic (proton-donating) activator (e.g., developer). The coating also includes an alloy (amorphous eutectic or polycrystalline) including a leuco-dye, an accelerator (preferably a low-melting aromatic compound), and an antenna. Leuco-dyes used in some embodiments of the invention may be fluoran-based compounds. The presence of the accelerator assists in reducing the melting temperature of high-melting fluoran dyes and, thus, provides improved reactivity upon heating. Use of an accelerator also facilitates uniform dissolution of the antenna in the leuco-dye alloy. The coating comprises two separate phases. The first phase includes the radiation-curable polymer matrix having the acidic activator dissolved in the polymer matrix. The second phase includes the low-melting eutectic of a leuco-dye that is either insoluble or which has relatively low solubility (such as, for example less than 5% solubility or less than 2% solubility) in the matrix, but that is uniformly distributed in the matrix as a fine dispersion.

The coating may be prepared by preparing an activator/antenna alloy. The activator is heated until melting and antenna is dissolved in the melt. Optionally, the antenna could be pre-dissolved in a smaller amount of the low melting organic solvent (melting aid) with subsequent addition and melting of the activator. The hot melt is cooled down to ambient temperature and ground to smaller particle size (typically below about 20 to about 50 μm) Smaller particle sizes may accelerate dissolution. In some embodiments, the activator includes an acidic (proton-donating) compound having a phenol group. Suitable activators for use with the present invention include any acidic compound such as, for example, bisphenol A, p-Hydroxy Benzyl Benzoate, TG-SA (Phenol, 4,4'-sulfonylbis[2-(2-propenyl)], and poly-phenols. Suitable activators should have good solubility with antenna.

Optionally, a melting aid may be added to the coating to lower the melting temperature of crystalline organic substances in the coating to a range of from about 50° C. to about 120° C. Suitable melting aids for use in the present invention may include any compounds that act as a good solvent for both the activator and the antenna. Examples of melting aids include, but are not limited to, m-tolyl ether of ethylene glycol, dibenzyl oxalate, and dibenzyl terephthalate.

The activator/matrix pre-polymer solution is then prepared by dissolving the ground activator/antenna alloy in a pre-polymer solution of the UV-curable matrix. The content of activator/antenna alloy in the pre-polymer solution may be in the range of from about 2 wt. % to about 90 wt. % (based on total weight of the pre-polymer solution), and some embodiments may contain from about 3 wt. % to about 60 wt. %, still other embodiments may contain from 5 wt. % to 45 wt. %. The ground activator/antenna alloy should be dissolved in pre-polymer phase such that the components are uniformly and homogeneously distributed in the liquid phase. Preparation of the activator/antenna alloy provides improved dissolution of the antenna in the liquid pre-polymer. This is particularly useful as many conventional IR dyes have low dissolution in high viscosity pre-polymers. Dissolution of antenna in the activator melt with subsequent dissolution of the melt in the pre-polymer enables uniform/homogeneous distribution of antenna in the matrix and improves sensitivity of the antenna to radiation of the imaging laser.

The leuco-dye alloy (eutectic) is prepared by dissolving the antenna in the accelerator melt. Leuco-dye is then dissolved in the accelerator melt, which results in the formation of a leuco-dye/accelerator/antenna alloy, is cooled down and ground to a fine powder, preferably having a particle size of not larger than about 20 μm, and more preferably of less than 10 μm. The leuco-dye used in the one particular embodiment of the invention is of a fluoran type.

Examples of acceptable fluoran leuco-dyes suitable for use with the present invention include structures having the formula:

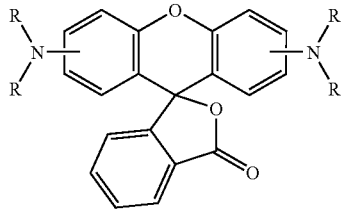
(7)

where R could be alkyl or aryl groups or H atoms.

Accelerators used in the current invention include crystalline organic solids with melting temperatures in the range of about 50° C. to about 150° C., and preferably having a melting temperature in the range of about 70° C. to about 120° C. Suitable accelerators include aromatic hydrocarbons (or their derivatives) that provide good solvent characteristics for leuco-dye and antennas used in the formulations and methods of the present invention. In addition to dissolving leuco-dye and antennas, the accelerator may also assist in reducing the melting temperature of the leuco-dye and stabilize the leuco-dye alloy in the amorphous state (or slow down the recrystallization of the leuco-dye alloy into individual components). Suitable accelerators for use in the current invention include, but are not limited to, m-terphenyl, p-benzyl biphenyl, β-naphtol benzylether, 1,2-bis(3,4-dimethylphenyl)ethane.

A thermochromic, UV-curable paste may be prepared by dispersing the powder of sensitized leuco-dye alloy in the solution of activator/antenna alloy in the radiation-curable pre-polymer (lacquer). The radiation-curable prepolymer acts as a solvent for the activator/antenna alloy and as dispersing media for leuco-dye alloy. The leuco-dye alloy, being poorly soluble in the activator/lacquer solution, exists in the mixture mostly as a separate phase. Suitable radiation-curable pre-polymers (lacquers) which absorb ink may include, by way of example, UV-curable matrices such as polymerizable acrylates, cellulose acetate, cellulose acetate-butyrate, polyimides, polyesters, polystyrene-maleic anhydride derivatives, Lascaux (a screen printing paste available form Lascaux Colours and Restauro, Zurich, Switzerland) and polyvinyl alcohol, acrylate derivatives, oligomers and monomers, with a photo package. In general any polymer with hydrophilic surface prepared from water miscible surfactants or monomers such as polyethyleneglycol acrylates or styrene-butadiene acrylates prepared by emulsion polymerization in water with Noigen polymerizabkle surfactants (available from Montello, Inc, Tulsa, Okla.). Additional examples include natural polymers such as chitosan and oxidized glucose. A photo package may include a light absorbing species which initiate reactions for curing of a lacquer, such as, by way of example, benzophenone derivatives. Other examples of photoinitiators for free radical polymerization monomers and pre-polymers include but are not limited to thioxanethone derivatives, anthraquinone derivatives, acetophenones and benzoine ethers. In particular embodiments of the invention, it may be desirable to choose a matrix which is cured by a form of radiation that does not cause a color change. Matrices based on cationic polymerization resins may require photoinitiators based on aromatic diazonium salts, aromatic halonium salts, aromatic sulfonium salts and metallocene compounds. A suitable lacquer or matrix may also include Nor-Cote CDG000 (a mixture of UV curable acrylate monomers and oligomers available from Nor-Cote International, Inc., Crawfordsville, Ind.) which contains a photoinitiator (hydroxy ketone) and organic solvent acrylates (e.g., methyl methacrylate, hexyl methacrylate, beta-phenoxy ethyl acrylate, and hexamethylene acrylate). Other suitable components for lacquers or matrices may include, but are not limited to, acrylated polyester oligomers, such as CN293 and CN294 as well as CN-292 (low viscosity polyester acrylate oligomer), SR-351 (trimethylolpropane triacrylate), SR-395(isodecyl acrylate) and SR-256(2(2-ethoxyethoxy)ethyl acrylate) (all of which are available from Sartomer Co., Exton, Pa.).

The thermochromic, UV-curable paste is printed on the substrate with subsequent radiation exposure to cure the coating. Selection of suitable photopackages for use in the radiation-curable lacquer should be made so that the activation wavelength of the photopackage is not significantly blocked by other species present in the coating. The cured coating is imageable by laser with emission wavelength tuned to the antenna absorption. Thus, the coating absorbs laser energy efficiently (i.e., at energy density levels as low as $0.1$–$0.5$ $J/cm^2$).

Referring now to the embodiments illustrated in FIG. 1, there is shown imaging medium 100, energy 110 from laser 170, ink 150 from inkjet printer 160, substrate 120, imaging composition 130, and suspended particles 140. Imaging medium 100 may comprise a substrate 120. Substrate 120 may be any substrate upon which it is desirable to make a mark, such as, by way of example only, paper (e.g., labels, tickets, receipts, or stationary), overhead transparencies, or the labeling surface of a medium such as a CD-R/RW/ROM, DVD±R/RW/ROM (or any format DVD) or Blue Laser-R/RW/ROM (or any format Blue Laser Disc).

Imaging composition 130 may comprise a matrix, an activator, and a radiation-absorbing compound such as an antenna. The activator and the antenna are soluble in the matrix. The formed accelerator/leuco-dye/antenna alloy may be substantially insoluble in the matrix and may be suspended or dispersed in the matrix as uniformly distributed particles 140. The imaging composition 130 (including the activator and the antenna) may be applied to the substrate via any acceptable method, such as, by way of example only, rolling, spraying, or screen printing.

Energy 110 may be directed to imaging medium 100 to form a marking or image. The form of energy may vary depending upon the equipment available, ambient conditions, and desired result. Examples of energy which may be used include IR radiation, UV radiation, or visible light. The antenna may absorb the energy and in some cases heat the imaging composition 130. The energy may cause suspended particles 140 to reach a temperature sufficient to cause the inter-diffusion of the color-forming species (e.g., leuco-dye) initially present in the particles (e.g., glass transition temperatures ($T_g$) or melting temperatures ($T_m$) of particles 140 and matrix). The activator and dye may then react to form a color or, where the leuco-dye is already colored, to change the color of the same.

The activator (e.g., bisphenol-A (4,4'-isopropylidene-diphenol)) and leuco-dye 90 (e.g., BK-400 Formula 8) may act in tandem to produce a mark.

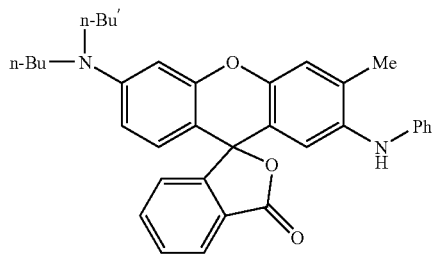

(8)

The activator and leuco-dye may be any two substances which, when reacted together, produce color change. When reacted, the activator may initiate a color change in the leuco-dye (i.e., develop the leuco-dye). The leuco-dye may have low solubility in the matrix at ambient temperature, but the solubility can increase significantly when the matrix is heated above the melting temperatures of the leuco-dye alloy and the matrix. Thus, upon heating, the leuco-dye may dissolve in the matrix. Because there is activator dissolved in the matrix, both leuco-dye and activator end up in the same phase (matrix), thus reacting with one another and producing color. Rapid cooling after imaging stabilizes the colored leuco-dye/activator complex dissolved in the matrix. In contrast, the formed leuco-dye/accelerator/antenna alloy may be substantially insoluble in the lacquer at ambient conditions. By "substantially insoluble," it is meant that the solubility of the leuco-dye in the lacquer at ambient conditions is so low, that no or very little color change may occur due to reaction of the dye and the activator at ambient conditions. Thus, in the embodiments described above, the activator is dissolved in the lacquer and the leuco-dye/accelerator/antenna alloy remains suspended or dispersed as a solid in the matrix at ambient conditions. Activators may include, without limitation, proton donors and phenolic compounds such as bisphenol-A and bisphenol-S. Leuco-dyes may include fluoran leuco-dyes. Leuco dyes suitable for use in the present invention include almost any known leuco dye. Suitable leuco dyes include, but are not limited to, fluorans, phthalides, amino-triarylmethanes, aminoxanthenes, aminothioxanthenes, amino-9,10-dihydro-acridines, aminophenoxazines, aminophenothiazines, aminodihydrophenazines, aminodiphenylmethanes, aminohydrocinnamic acids (cyanoethanes, leuco methines) and corresponding esters, 2(p-hydroxyphenyl)-4,5-diphenylimidazoles, indanones, leuco indamines, hydrozines, leuco indigoid dyes, amino-2,3-dihydroanthraquinones, tetrahalo-p,p'-biphenols, 2(p-hydroxyphenyl)-4,5-diphenylimidazoles, phenethylanilines, and mixtures thereof. In one aspect of the present invention, the leuco dye can be a fluoran, phthalide, aminotriarylmethane, or mixture thereof. Several non-limiting examples of suitable fluoran based leuco dyes include 3-diethylamino-6-methyl-7-anilinofluorane, 3-(N-ethyl-p-toluidino)-6-methyl-7-anilinofluorane, 3-diethylamino-6-methyl-7-(o,p-dimethylanilino)fluorane, 3-pyrrolidino-6-methyl-7-anilinofluorane, 3-piperidino-6-methyl-7-anilinofluorane, 3-(N-cyclohexyl-N-methylamino)-6-methyl-7-anilinofluorane, 3-diethylamino-7-(m-trifluoromethylanilino)fluorane, 3-dibutylamino-6-methyl-7-anilinofluorane, 3-diethylamino-6-chloro-7-anilinofluorane, 3-dibutylamino-7-(o-chloroanilino)fluorane, 3-diethylamino-7-(o-chloroanilino)fluorane, 3-di-n-pentylamino-6-methyl-7-anilinofluoran, 3-di-n-butylamino-6-methyl-7-anilinofluoran, 3-(n-ethyl-n-isopentylamino)-6-methyl-7-anilinofluoran, 3-pyrrolidino-6-methyl-7-anilinofluoran, 1(3H)-isobenzofuranone,4,5,6,7-tetrachloro-3,3-bis[2-[4-(dimethylamino)phenyl]-2-(4-methoxyphenyl)ethenyl], and mixtures thereof. Aminotriarylmethane leuco dyes can also be used in the present invention such as tris(N,N-dimethylaminophenyl) methane (LCV); deutero-tris(N,N-dimethylaminophenyl) methane (D-LCV); tris(N,N-diethylaminophenyl) methane (LECV); deutero-tris(4-diethylaminolphenyl) methane (D-LECV); tris(N,N-di-n-propylaminophenyl) methane (LPCV); tris(N,N-din-butylaminophenyl) methane (LBCV); bis(4-diethylaminophenyl)-(4-diethylamino-2-methyl-phenyl) methane (LV-1); bis(4-diethylamino-2-methylphenyl)-(4-diethylamino-phenyl) methane (LV-2); tris(4-diethylamino-2-methylphenyl) methane (LV-3); deutero-bis(4-diethylaminophenyl)-(4-diethylamino-2-methylphenyl) methane (D-LV-1); deutero-bis(4-diethylamino-2-methylphenyl)(4-diethylaminophenyl) methane (D-LV-2); bis(4-diethylamino-2-methylphenyl)(3,4-dimethoxyphenyl) methane (LB-8); aminotriarylmethane leuco dyes having different alkyl substituents bonded to the amino moieties wherein each alkyl group is independently selected from C1–C4 alkyl; and aminotriaryl methane leuco dyes with any of the preceding named structures that are further substituted with one or more alkyl groups on the aryl rings wherein the latter alkyl groups are independently selected from C1–C3 alkyl.

Lacquer 30 may be any suitable matrix for dissolving and/or dispersing the activator, antenna, and color former so long as the matrix is an ink absorbing matrix. Acceptable lacquers/matrices may include, by way of example only, UV curable matrices such as polymerizable acrylates, cellulose acetate, cellulose acetate-butyrate, polyimides, polyesters, polystyrene-maleic anhydride derivatives, Lascaux screen-printing paste, and polyvinyl alcohol, acrylate derivatives, oligomers and monomers, with an optional photo package. In general any polymer with hydrophilic surface prepared form water miscible surfactants or monomers such as polyethyleneglycol acrylates or styrene-butadiene acrylates prepared by emulsion polymerization in water with Noigen polymerizable surfactants. Additional examples include natural polymers such as chitosan and oxidized glucose. A photo package may include a light-absorbing species which initiates reactions for curing of a lacquer, such as, by way of example, benzophenone derivatives. Other examples of photoinitiators for free radical polymerization monomers and pre-polymers include but are not limited to: thioxanethone derivatives, anthraquinone derivatives, acetophenones and benzoine ether types. It may be desirable to choose a matrix that is cured by a form of radiation other than the type of radiation which causes a color change. Matrices based on cationic polymerization resins may require photoinitiators based on aromatic diazonium salts, aromatic halonium salts, aromatic sulfonium salts and metallocene compounds.

EXAMPLE

The following example illustrates a particular method for preparing an imaging solution in accordance with embodiments of the present invention. The following example should not be considered as limitations of the present invention, but should be viewed as representative embodiments and tests of the print medium based upon current experimental data.

A coating containing leuco crystal violet fluoran leuco dye, bisphenol A activator, m-terphenyl melting aid, and IR780 dispersed in a matrix polymer dispersion of Lascaux screenprinting paste and polyvinyl alcohol is prepared as follows. The coating was prepared in two parts, which are mixed to make a paste. A first part was prepared by mixing 3.5 g of leuco crystal violet, 9.0 g of 10% polyvinyl alcohol (88% hydrolyzed) in water, and 0.4 g Triton 405 (polyoxyethylene(40) isooctylphenyl ether)) in a high shear mixer and ground in a ball mill for 24 hours.

A second part was prepared by mixing 7.0 g benxyl-4-hydroxy benzoate, 0.35 g Calfax DB45 (a surfactant available from Pilot Chemical Company, Santa Fe Springs, Calif.), 1.7 g of a 10% solution of polyvinyl alcohol and diethylene glycol. The second part was mixed in a high shear mixer and then ground in a ball mill for 24 hours. The first and second parts were mixed at the end of grinding period to give a thick paste. Indocyanine Green (Formula 9) (20 mg) was added and mixed thoroughly. The coating was then screen printed to an optical disc. A 780 nm laser from standard OPU of a CD drive was used to mark these coatings. Marks were produced at the speed of 0.25 M/sec. The same disc was loaded into an inkjet printer equipped with a disc writing adapter. Inkjet images were produced upon completion of printing operation.

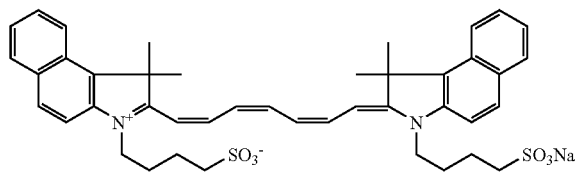

(9)

A coating using similar procedure was used to produce coatings using 16.7 g Fluoran Dye S-205, (available form Sofix, Chattanooga, Tenn.) dye milled in water and isopropylalcohol (first part), and 33.3 g 4-benzyloxybenzoate milled in water 24 for hours (second part), and the paste was prepared mixing the first part and the second part with 50 g Lascaux, followed by addition and through mixing of 0.9 g Indocyanine Green. The resulting paste was coated using screen printing and marked above with laser and imaged with and inkjet printer.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An imaging composition comprising:
   a laser imaging system incorporated within an ink absorbing matrix, wherein the laser imaging system includes a laser imaging component that undergoes a color change in response to laser energy incident on said laser imaging component.

2. The imaging composition of claim 1 wherein the matrix comprises at least one compound chosen from the group consisting of cellulose acetate, cellulose acetate-butyrate, polymerizable acrylates, polyimides, polyesters, polystyrene-maleic anhydride derivatives, hydrophilic polymers with polyoxaethylene surface groups, polyvinyl alcohol, and mixtures thereof.

3. The imaging composition of claim 1 wherein the ink absorbing matrix absorbs inkjet ink.

4. An imaging composition comprising:
   a laser imaging system incorporated within an ink absorbing matrix wherein the laser imaging system comprises a leuco dye, an activator, and a radiation absorber.

5. A dual printable medium comprising:
   a substrate;
   a laser imaging system dispersed in an ink absorbing matrix on the substrate wherein the laser imaging system includes a laser imaging component that undergoes a color change in response to laser energy incident on said laser imaging component.

6. The dual printable medium of claim 5 wherein the matrix comprises at least one compound chosen from the group consisting of cellulose acetate, cellulose acetate-butyrate, polymerizable acrylates, polyimides, polyesters, polystyrene-maleic anhydride derivatives, polyvinyl alcohol, and mixtures thereof.

7. The dual printable medium of claim 5 wherein the ink absorbing matrix absorbs inkjet ink.

8. A dual printable medium comprising:
   a substrate;
   a laser imaging system dispersed in an ink absorbing matrix on the substrate, wherein the laser imaging system comprises a leuco dye, an activator, and an antenna.

9. A means for imaging, the means comprising:
   a means for laser imaging, wherein the means for laser imaging comprises
      a means for absorbing ink and the means for absorbing ink includes
      a means for absorbing laser energy and a color-changing means that changes color in response to the absorbed energy.

10. The means for imaging of claim 9 wherein the means for absorbing comprises at least one compound chosen from the group consisting of cellulose acetate, cellulose acetate-butyrate, polymerizable acrylates, polyimides, polyesters, polystyrene-maleic anhydride derivatives, polyvinyl alcohol, and mixtures thereof.

11. The means for imaging of claim 9 wherein the means for absorbing absorbs inkjet ink.

12. A means for imaging, the means comprising:
   a means for laser imaging, wherein the means for laser imaging comprises a means for absorbing ink, a leuco dye, an activator, and an antenna.

* * * * *